US010762211B2

(12) United States Patent
Clift et al.

(10) Patent No.: US 10,762,211 B2
(45) Date of Patent: Sep. 1, 2020

(54) SOURCE CODE DIAGNOSTIC INSTRUMENT

(71) Applicants: Robert Thomas Clift, King George, VA (US); Ashley L. Bowry, Vienna, VA (US); Jon T. Posch, Fredericksburg, VA (US)

(72) Inventors: Robert Thomas Clift, King George, VA (US); Ashley L. Bowry, Vienna, VA (US); Jon T. Posch, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 267 days.

(21) Appl. No.: 15/951,412

(22) Filed: Apr. 12, 2018

(65) Prior Publication Data

US 2019/0318098 A1 Oct. 17, 2019

(51) Int. Cl.
*G06F 21/57* (2013.01)
*G06F 11/36* (2006.01)

(52) U.S. Cl.
CPC ........ *G06F 21/577* (2013.01); *G06F 11/3664* (2013.01); *G06F 11/3692* (2013.01); *G06F 2221/033* (2013.01)

(58) Field of Classification Search
CPC . G06F 21/577; G06F 21/3692; G06F 11/3664
See application file for complete search history.

(56) References Cited

U.S. PATENT DOCUMENTS

| | | | | |
|---|---|---|---|---|
| 5,119,377 A * | 6/1992 | Cobb | G06F 11/366 | 714/38.11 |
| 5,325,530 A * | 6/1994 | Mohrmann | G06F 9/4843 | 714/35 |
| 5,764,989 A * | 6/1998 | Gustafsson | G06F 8/48 | 714/E11.21 |
| 6,253,368 B1 * | 6/2001 | Nelin | G06F 11/3664 | 717/124 |
| 6,412,106 B1 * | 6/2002 | Leask | G06F 11/3664 | 714/E11.217 |
| 2004/0226007 A1 * | 11/2004 | Guarraci | G06F 8/73 | 717/158 |
| 2008/0046786 A1 * | 2/2008 | Patel | H04L 43/0817 | 714/100 |
| 2014/0123110 A1 * | 5/2014 | Wan | G06F 11/3672 | 717/124 |
| 2014/0164208 A1 * | 6/2014 | Mueller | G06Q 10/0639 | 705/37 |
| 2017/0153967 A1 * | 6/2017 | Kalech | G06F 11/3664 | |
| 2018/0005153 A1 * | 1/2018 | Ferguson, IV | G06Q 10/06311 | |
| 2018/0253368 A1 * | 9/2018 | Villarreal | G06F 11/277 | |

* cited by examiner

*Primary Examiner* — Sher A Khan
(74) *Attorney, Agent, or Firm* — Gerhard W. Thielman

(57) ABSTRACT

A computer-implemented consolidation method is provided for identifying software vulnerability anomalies in a source code. This method includes providing a plurality of diagnostic tools; receiving the source code; selecting a subset plurality of tools; scanning the source code by the subset plurality for the anomalies to produce a diagnostic output; sorting the output by removing anomaly duplicates into a report; and saving the report into memory. Each tool among the plurality is able to detect the anomalies in software.

9 Claims, 18 Drawing Sheets

******* FLAME REPORT *******

ANALYSIS FILE/DIR: \\filer\home_k52\k52\flame\test
DATE: Fri Dec 27 15:40:55 EST 2013
LANGUAGE: C/C++
NUMBER OF SOURCE FILES: 29
SLOC: 25545
NUMBER OF COMPILED FILES: 0

DETAILED OUTPUT

ANALYSIS SUMMARY

SEE FILE: raw.out FOR MORE DETAILS.

LOAD THE FILE FLAME.TXT INTO EXCEL AS SEMI-COLON-DELIMITED FILE.

1200

1210

FLAGS IN FILE: /auto/k52fc/mod4/working/unix/vul_code/CWE_250_unnecessary_privileges.c 8: (Risky) chroot
Don't forget to chdir() first! Also can lead tp process/file interaction race conditions (TOCTOU category A)
Manipulate file descriptors, not symbolic names, when possible.
- - - - - - - - - - - -
chroot
chroot can be very helpful, but is hard to use correctly. Make sure the program immediately chdir("/"), closes file descriptors, and drops root privileges, and that all necessary files (and no more!) are in the new root.

1220

9: (Risky) chdir
Can lead to process/file interaction race conditions (TOCTOU problems)
Manipulate file descriptors, not symbolic names, when possible.

1230

- - - - - - - - - - - -
11: (Risky) open
Can be involved in a race condition if you open things after a poor check. For example, don't check to see if something is not a symbolic link before opening it. Open it, then check bt querying the resulting object. Don't run tests on symbolic file names...
Perform all checks AFTER the open, and based on the returned object, not a symbolic name.
- - - - - - - - - - - -
open:
Check when opening files - can an attacker redirect it (via symlinks), force the opening of special file type (e.g., device files), move things around to create a race condition, control its ancestors, or change its contents?.

1240

16: Resource leak: data constant for the format specification.

Sample raw output data from scanning tools:

1410: /home/server/_k53_FORTIFY_DDCIL_TEST/src/media.c:461: (4) (buffer) sprint. Does not check for buffer overflows. Use snprintf or vsnprintf.

1420: /home/server/_k53_FORTIFY_DDCIL_TEST/src/sanit_input.c:420: (1) (buffer) strlen: Does not handle strings that are not \0-terminated (it could cause a crash if unprotected).

1430: /home/server/_k53_FORTIFY_DDCIL_TEST/src/media.c:461: High: sprint. Check for buffer overflows.

1440: /home/server/_k53_FORTIFY_DDCIL_TEST/src/ddc.c:110: High: umask() can easily be used to create files with unsafe privileges. It should be set to restricted values.

1450: /home/server/_k53_FORTIFY_DDCIL_TEST/src/userin.c:2585: (2) (buffer) char. Statically-sized arrays can be overflowed. Perform bounds checking, use functions that limit length, or ensure that the size is larger than the maximum possible length.

1460: NOTE: This error was duplicated by two separate tools.

1400

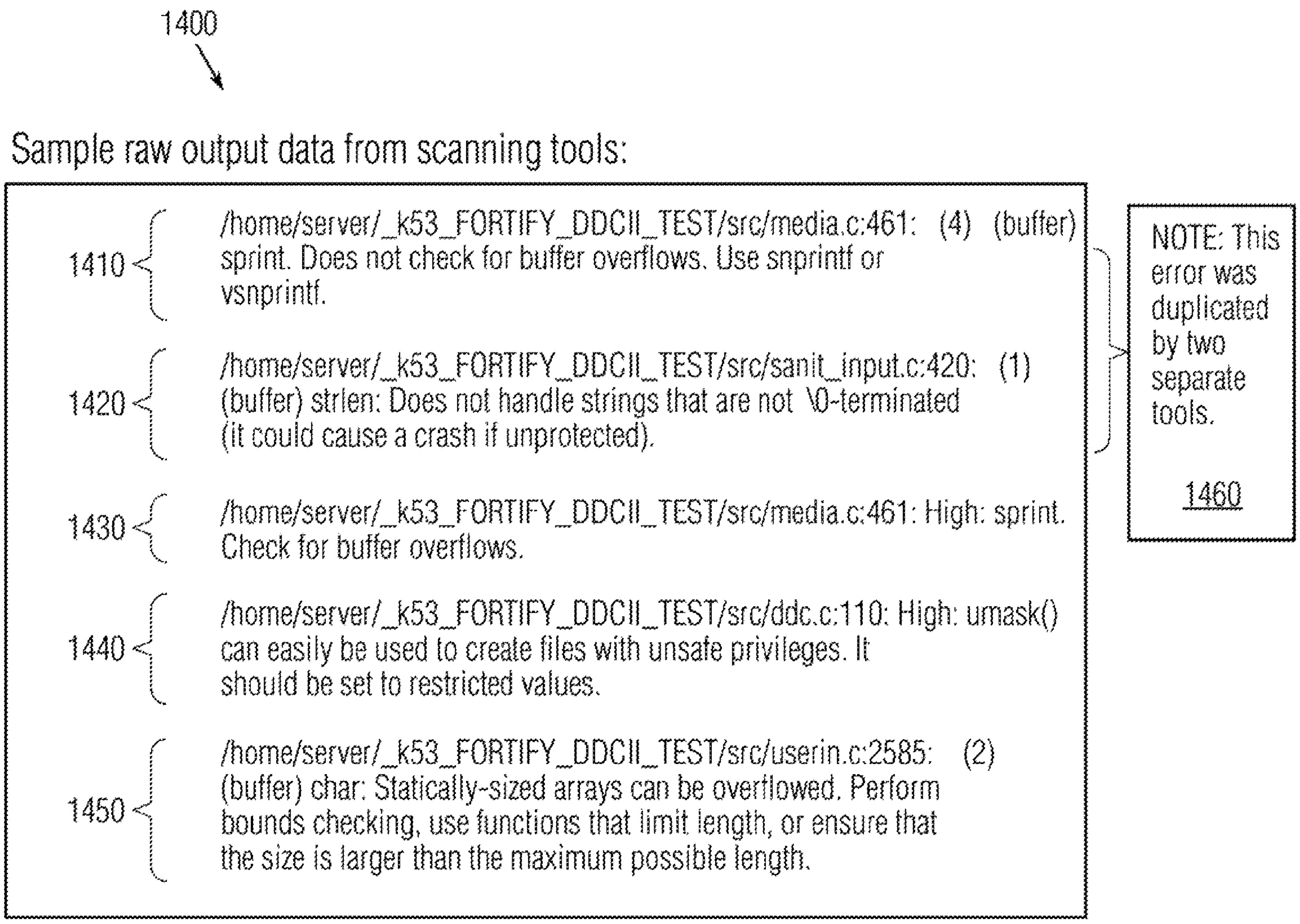

```
//Based on file type, set default options if default box is //checked. Type 1 = c
and Type 2 = java

        if (defaultButton.isSelected()) {
          if (type == 1) {
            set_C_boxes(true);
            set_Java_boxes(true);

          for (int i = 0; i <NUM_C_TOOLS; i++) {
               options[i] = true;
          }
            for (int i = NUM_C_TOOLS; i < options.length;i++)
             {
               options[i] = false;
          }
    } else if (type == 2) {

          for (int i = 0; i < NUM_C_TOOLS; i++) {
               options[i] = false;
          }
          for (int i = NUM_C_TOOLS; i < options.length; i++)
            {
               options {i} = true;
          }
        }
```

```
//Enable checkboxes based on c files

        else if (customButton.isSelected()) {
          if   (type ==1) {
               flawCheck.setEnabled(enable);
               cppCheck.setEnabled(enable);
               ratsCheck.setEnabled(enable);
               its4Check.setEnabled(enable);
               set_C_boxes(true);

               if (flawCheck.isSelected()) {
                 options[0] = true;
               }
               if (ratsCheck.isSelected()) {
                 options[1] = true;
               }
               if (its4Check.isSelected()) {
                 options[2] = true;
               }
               if (cppCheck.isSelected()) {
                 options[3] = true;
               }
                 }
```

```
//Enable checkboxes for java files

        } else if (type == 2) {

                checkCheck.setEnabled(enable);
                bugsCheck.setEnabled(enable);
                pmdCheck.setEnabled(enable);
                set_C_boxes(true);

                for (int i = 0; i <NUM_C_TOOLS; i++) {
                  options[i] = false;
                }
                if (checkCheck.isSelected()) {
                  options[NUM_C_TOOLS] = true;
                }
                if (bugsCheck.isSelected()) {
                  options[NUM_C_TOOLS+1] = true;
                }
                if (pmdCheck.isSelected()) {
                  options[NUM_C_TOOLS+2] = true;
                }
```

```
If (Options[0] && !scrollFrame.get_ifCancelSelected()) {
        scrollFrame.write_toMessageArea ("\Running FlawFinder..\n");
        FlawFinder flawFinder = new FlawFinder(Files,
currentDirectory, Raw_Output);
        flawFinder.process_Tool_Data();
        storeData(flawFinder.errorTypeKeys, flawFinder.errorTypeValues,
flawFinder.fileSortKeys, flawFinder.fileSortValues) };
```

```
            try {
                Process p = Runtime.getRuntime().exec(runLine);
                read_outStream(p.getErrorStream());
                read_outStream(p.getInputStream());
                p.waitFor();
                Thread.sleep(1000);
            } catch (Exception ex) {}
        }
    }
```

```
try (PrintWriter os = new PrintWriter(new
            FileOutputStream(rawOutputFile, true))) {
        Scanner sc = new Scanner(src);
            while (sc.hasNextLine()) {
                currentLine = sc.nextLine().toString();
                os.println(currentLine);
                outputStream.add(currentLine);
            }

            os.close();
```

```
Flawfinder version 1.27, (C) 2001-2004 David A. Wheeler.
Number of dangerous functions in C/C++ ruleset: 160
Examining test.c}
test.c:32: [5] (buffer) gets:
  Does not check for buffer overflows. Use fgets() instead.
test.c:56: [5] (buffer) strncat:
  Easily used incorrectly (e.g., incorrectly computing the correct
  maximum size to add). Consider strlcat or automatically resizing strings.
  Risk is high; the length parameter appears to be a constant, instead of
  computing the number of characters left.
test.c:57: [5] (buffer) tcsncat:
  Easily used incorrectly (e.g., incorrectly computing the correct
  maximum size to add). Consider strlcat or automatically resizing strings.
  Risk is high; the length parameter appears to be a constant, instead of
  computing the number of characters left.
```

```
test.c:32: [5] (buffer)

test.c:56: [5] (buffer)

test.c:57: [5] (buffer)
```

```
private void fileSort_MapAdder(String key, String value) {

        if (key != null && value != null) {
            if (! fileSortMap.containsKey(key)) {
                HashSet<String> currHash = new
                                HashSet<>(Arrays.asList(value));
                fileSortMap.put(key, currHash);
            } else {
                fileSortMap.get(key).add(value);
            }
        }
```

```
public void print_ProcessedData(Map<String, HashSet> errorTypeMap,
            Map<String, HashSet> fileSortMap, string rawOutput,
            boolean sortByError){

    ArrayList summaryStrings = new ArrayList();

    scrollFrame.write_toMessageArea("\n"),

    if (sortByError) {
        // Print the errors grouped by error type
        for (Map.Entry<String, HashSet> entry:
                                errorTypeMap.entrySet()) {
            String message = entry.getKey() +","+
                    entry.getValue().size();
            scrollFrame.write_toMessageArea("NUMBER OF " +
                        message.replace(",", " ERRORS:") + "\n");
            summaryStrings.add(message);
            error_MapPrinter(entry.getValue(), entry.getKey());
        }
```

Fig. 24

SOURCE CODE DIAGNOSTIC INSTRUMENT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to detection of erroneous source code. In particular, the invention relates to techniques to discover and identify flaws in source code and consequently software products.

Computers are instructed to execute various commands using code written in higher level languages. The code is compiled into machine language based on its architecture by mapping the instruction syntax into binary operations to produce an executable code, which is then run on the computer's processor. Conventional techniques for source code diagnostic identification and analysis for correction have limitations that adversely affect ability of coders to produce software free or errors and potential vulnerabilities.

Producing completely error-free code is nearly impossible absent the aide of source code scanning tools. These techniques can be commercially available or open source in order to significantly reduce the quantity of errors. Various methods, whether automated or manual, have been experimented with over the years to reduce source code errors with success, but these have comparative advantages and disadvantages.

Research has demonstrated that a combination of automated and manual source code review constitutes the best manner to reduce the greatest number of coding errors. Methods to reduce source code vulnerabilities typically center around corporate policy, availability of technical personnel, project timelines and budgetary constraints.

SUMMARY

Conventional diagnostic software tools yield disadvantages addressed by various exemplary embodiments of the present invention. In particular, exemplary embodiments provide a method for collectively using separate individual tools to scan source code and inform developers of security related weaknesses or potential flaws using established exploitation methods, so as to detect and organize the results into a single document. Other various embodiments alternatively or additionally provide for rectifying code vulnerabilities that can expose sensitive information.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 12 is a flag list view;

FIG. 14 is a raw analysis output; and

FIG. 16 is a code portion for setting default options;

FIG. 17A is a code portion for enabling custom selection based on C and C++ files;

FIG. 17B is a code portion for enabling custom selection based on Java files;

FIG. 18 is a code portion for establishing object, run tool and output storage;

FIG. 19 is a code portion for establishing a Java process to run a code scanning tool;

FIG. 20 is a code portion for printing an output stream;

FIG. 21 is a code portion for a raw output from FlawFinder;

FIG. 22 is a code portion for an output in regular expression;

FIG. 23 is a code portion for adding hashset to store filename errors; and

FIG. 24 is a code portion for printing data to an observer's screen.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP), other related component.

Secure code analysis has become commonplace in many commercially developed applications. The Defense Information Systems Agency (DISA) released official guidance in 2010 for securing information technology and information assurance products in the Department of Defense as installed and executed on various code executing hardware platforms, such as computers.

Figure 1:
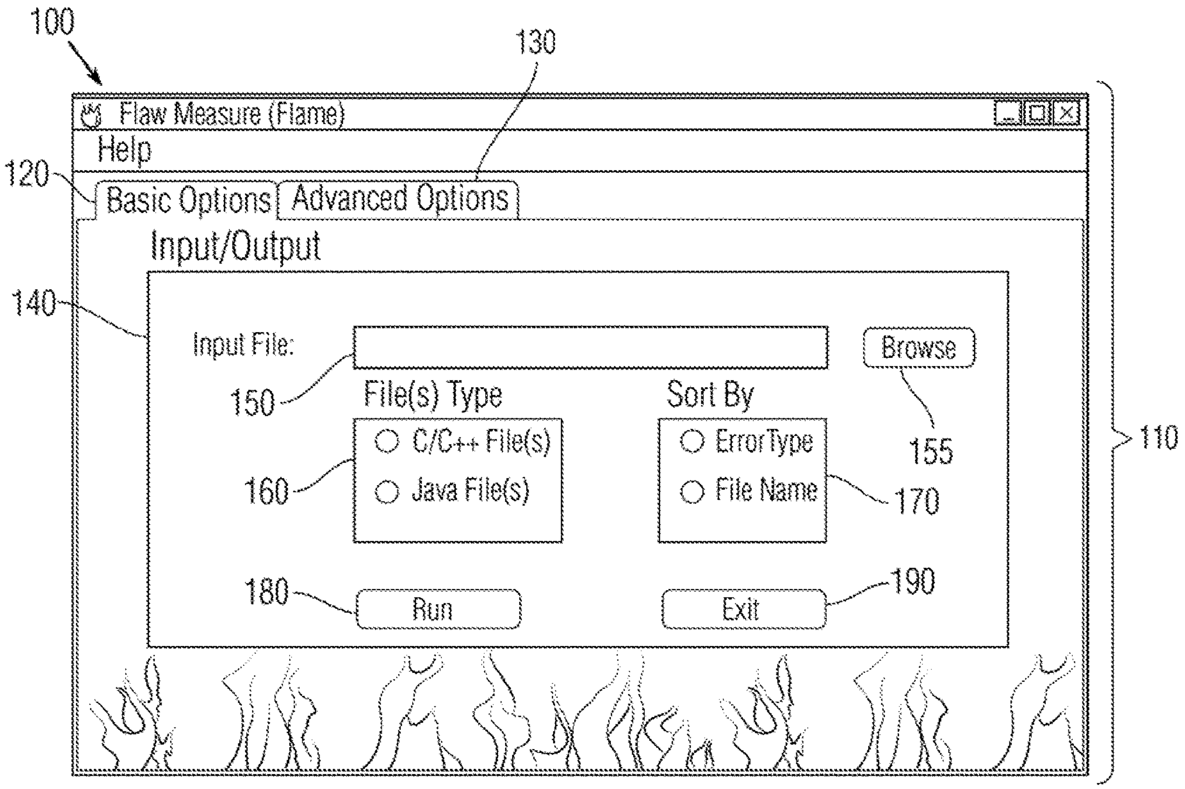
FIG. 1 is a screen window view of a FLAME GUI upon execution.

FIG. 1 shows a screen window view 100 of a graphical user interface (GUI) 110 for FLAw MEasure upon execution. A menu in the upper left corner includes tabs for Basic Options 120 and Advanced Options 130. The display portion includes an input/output section 140 that includes a dialog box 150 for input file selection coupled with a browse button 155. Also included button selections for file type box 160, and sorting criteria box 170. Finally, execution can be initiated by selecting a "run" button 180 or cancellation by selecting an "exit" button 190.

Figure 2:
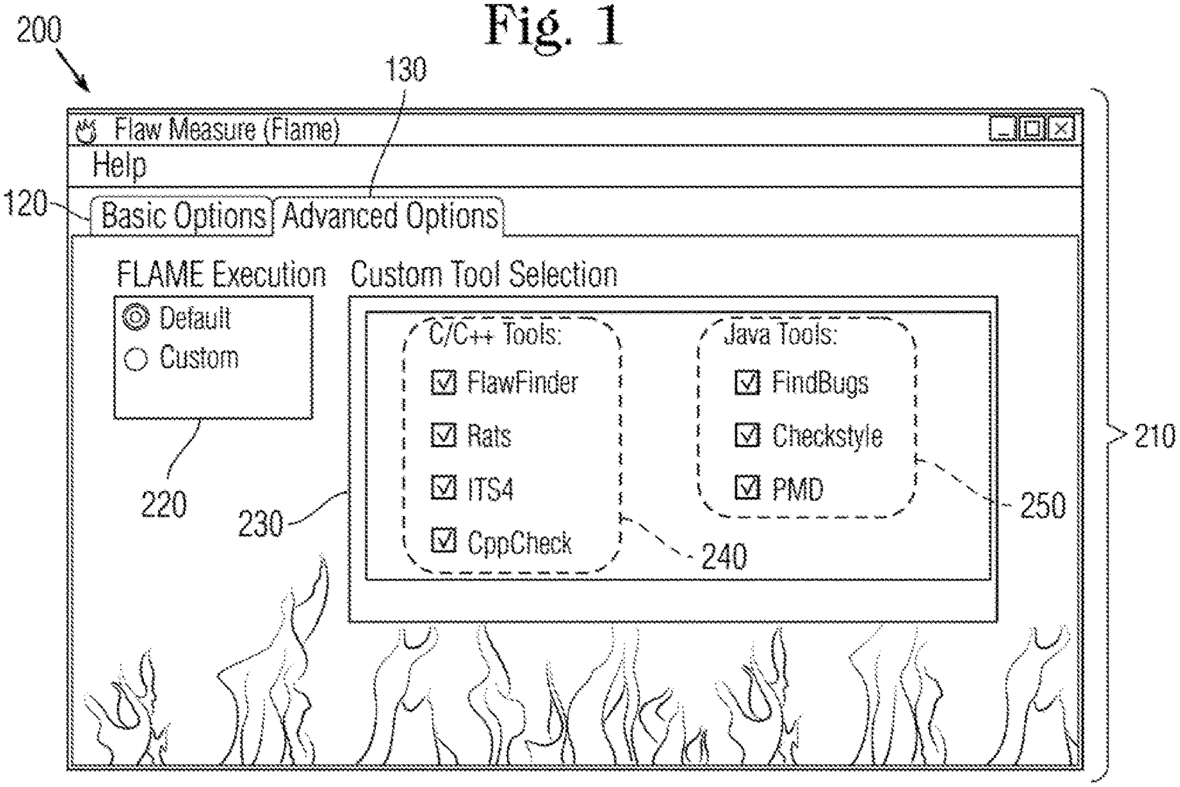
FIG. 2 is a screen window view of a FLAME GUI for alternate tab.

FIG. 2 shows a screen window view 200 of an advanced options panel GUI 210 for FLAME. Selection of the Advanced Options 130 presents a FLAME execution selection 220 for default or custom and a custom tool selection 230 that for the disclosed embodiment includes C/C++ tools 240 and Java tools 250, although other higher-level languages can be contemplated without departing from the scope of the claims.

Figure 3:
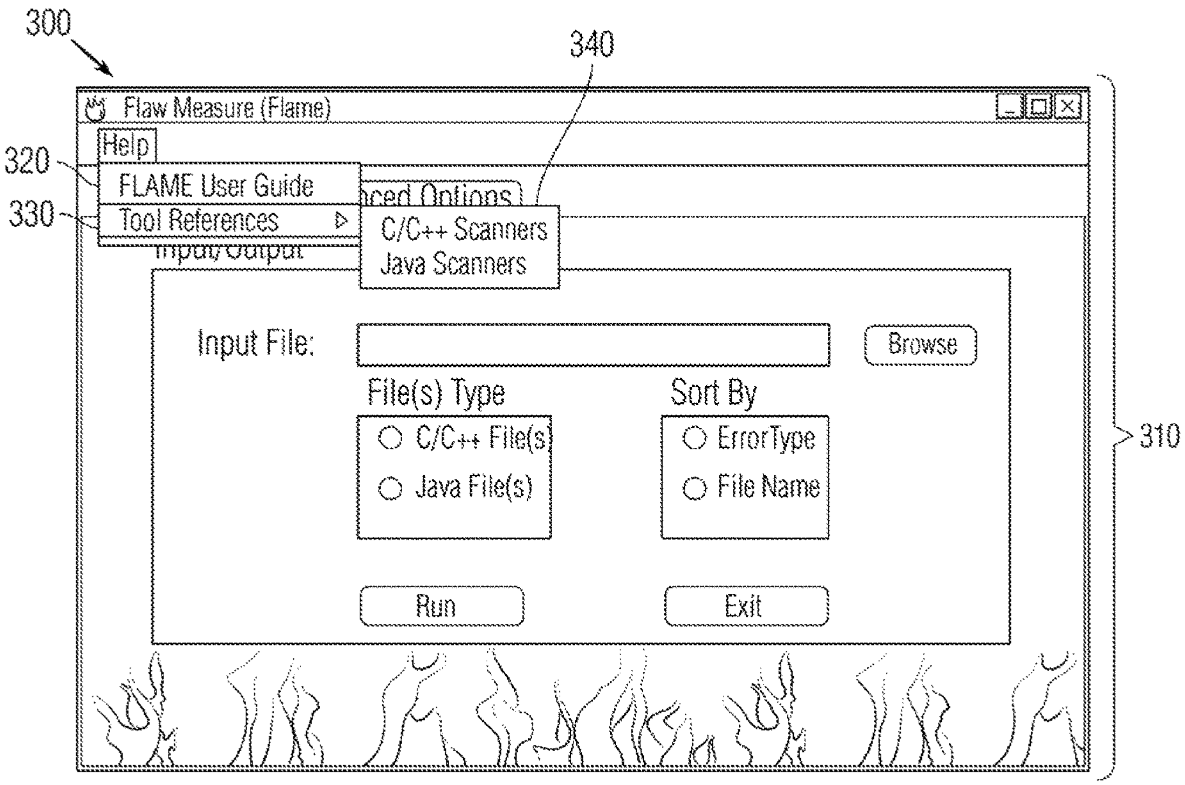
FIG. 3 is a screen window view of a program scanner options.

FIG. 3 shows a screen window view 300 of a scanning reference tool selection in the GUI menu panel 310 for FLAME. The menu includes a FLAME User Guide 320 with a sub-selection for Tool References 330 that interactively displays options 340 for C/C++ scanners and Java scanners.

Figure 4:
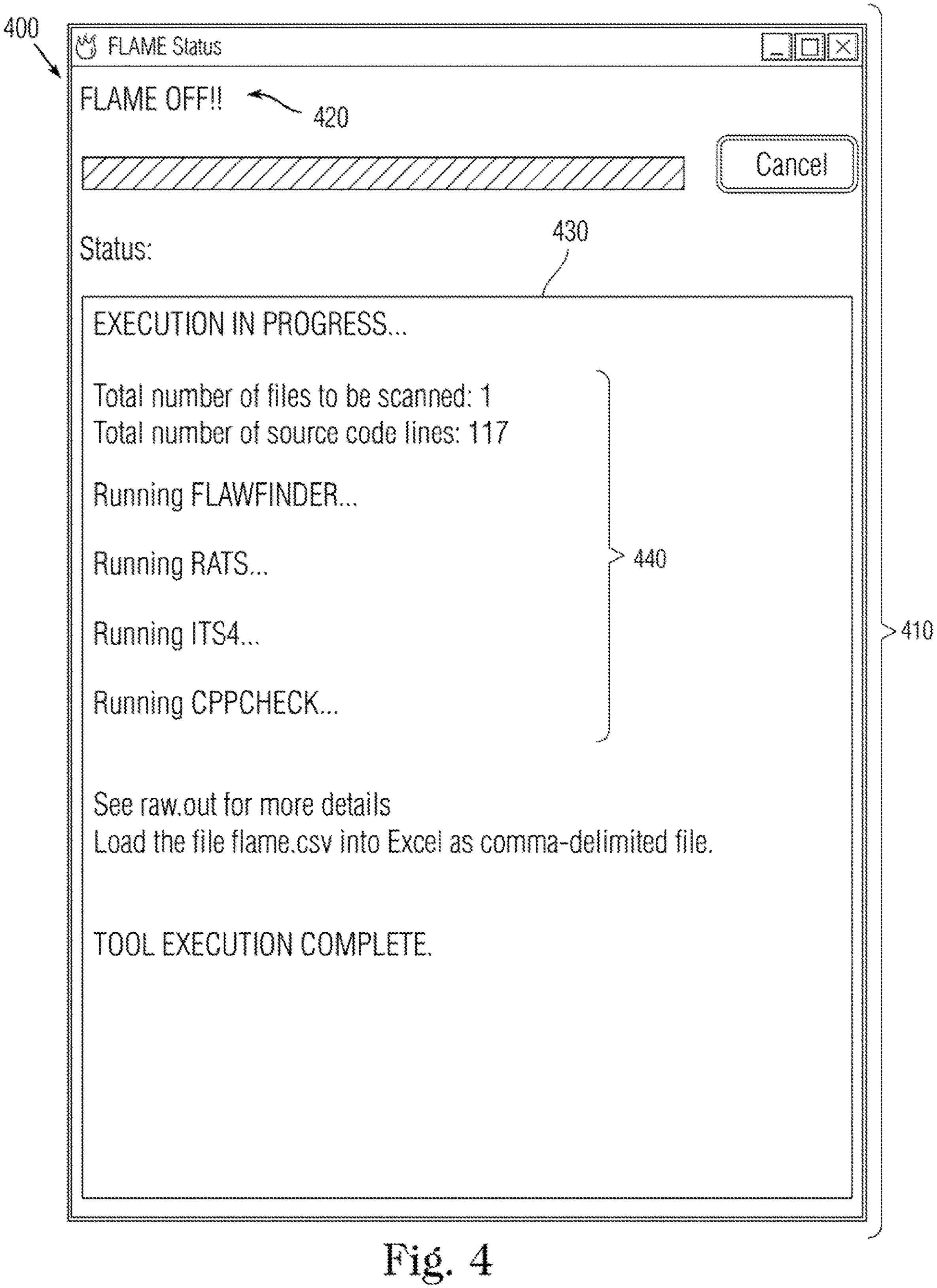
FIG. 4 is a screen window view of summary status.

FIG. 4 shows a status summary display view 400 for FLAME. A FLAME status screen 410 features an indicator 420 and a message pane 430 that includes execution status 440.

Figure 5A:
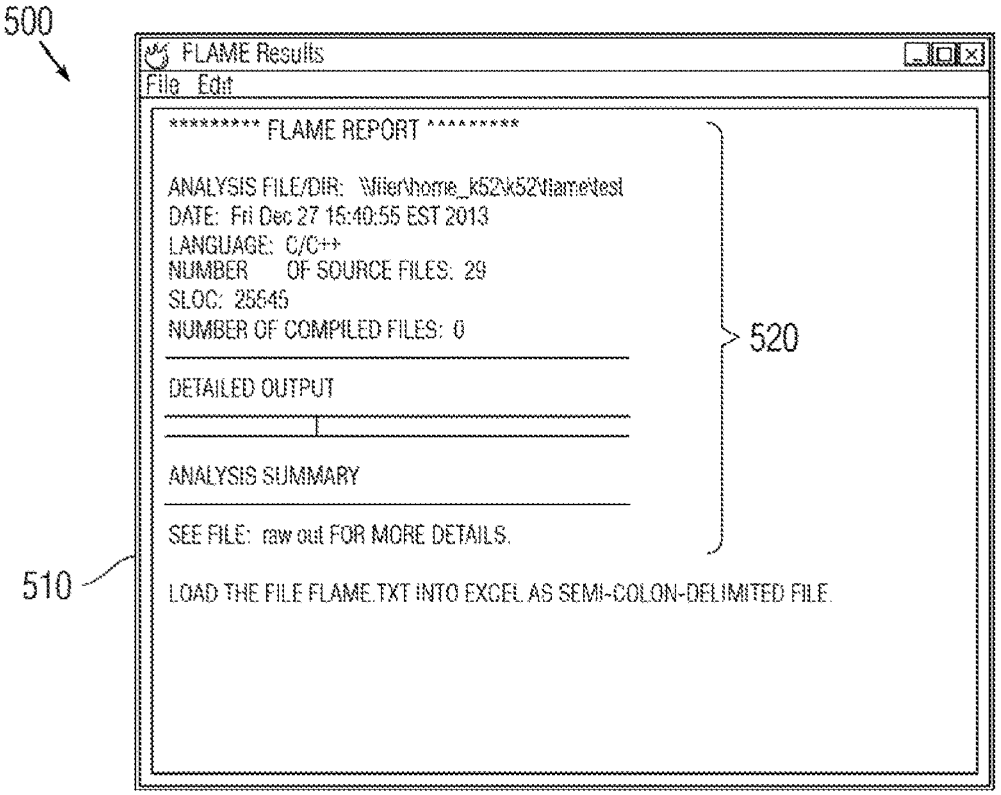
FIGS. 5A and 5B are screen and detail views of a FLAME report.
Figure 5B:
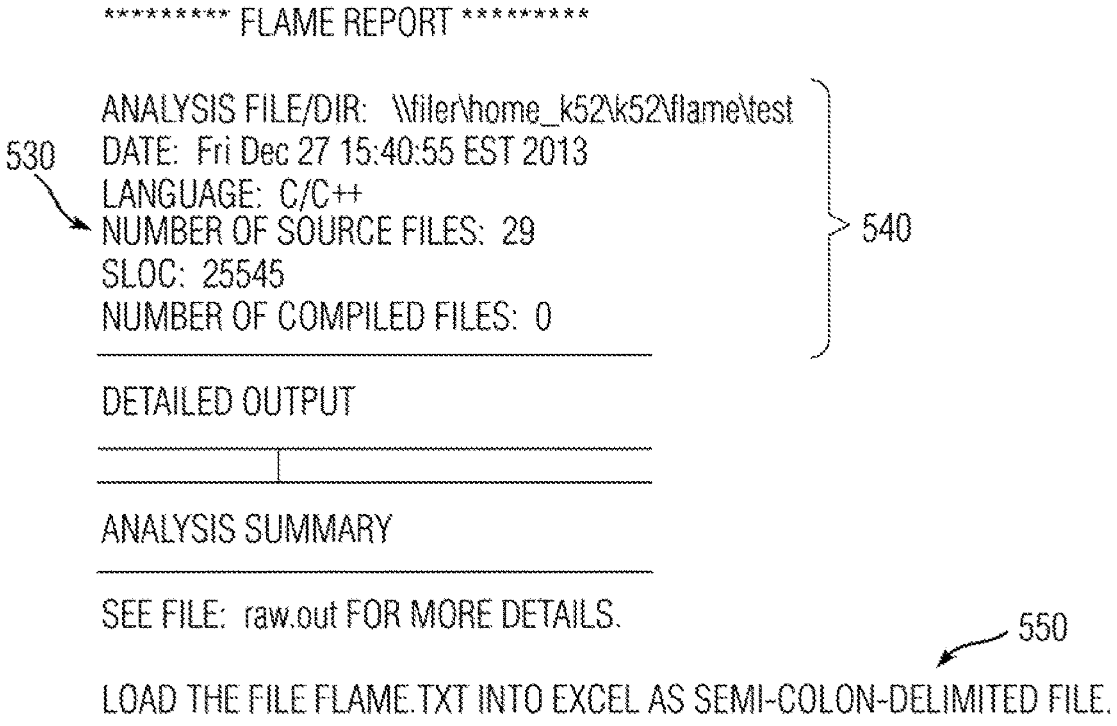

FIG. 5A shows a screen window view 500 of FLAME results that have been processed and sorted in a screen 510. A FLAME report 520 provides an output summary. FIG. 5B shows a detail view 530 of the report 520 as an analysis summary 540 and an identified delimited file 550 for loading as a spreadsheet into Excel.

Figure 6:
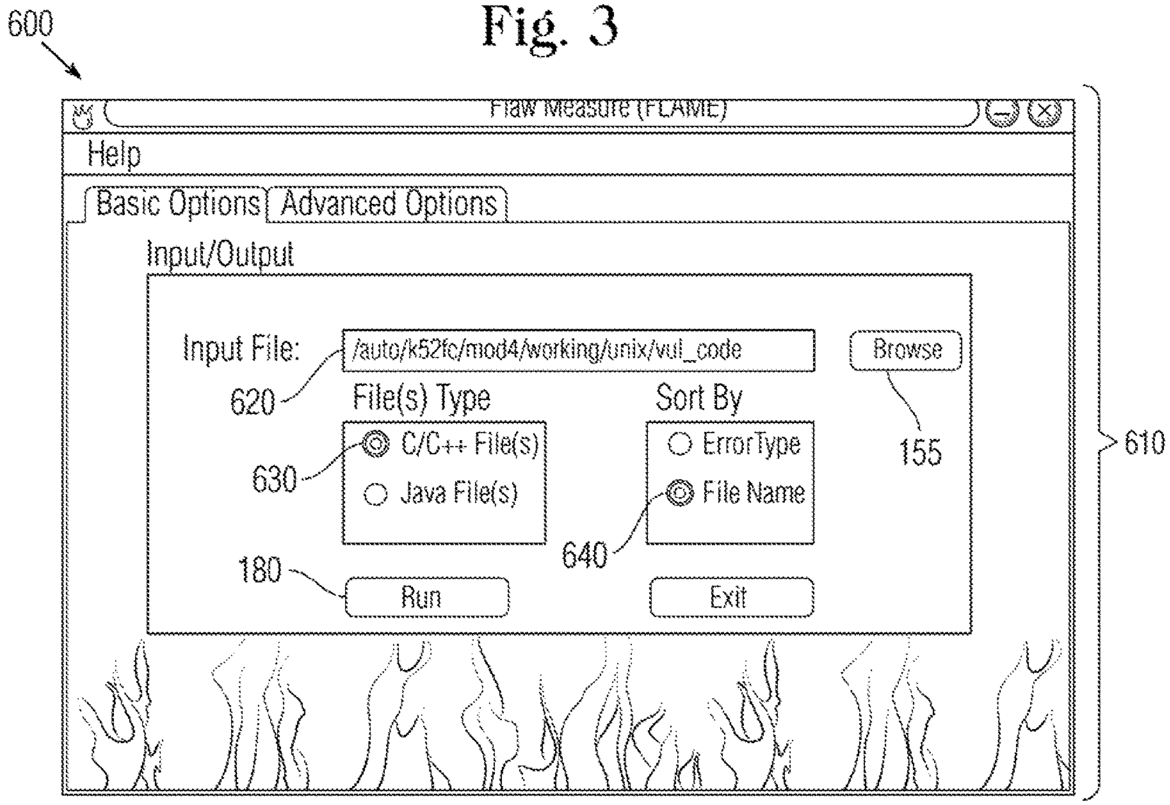
FIG. 6 is a screen window view with selection settings.

FIG. 6 shows a screen window view 600 of example file and sorting selections for FLAME. A basic options GUI 610 includes a file name in the dialog box 620 analogous to the unfilled dialog box 150 adjacent the browse button 155. The file type 160 includes a C/C++ selection 630, and the sorting type 170 includes a filename selection 640.

Figure 7:
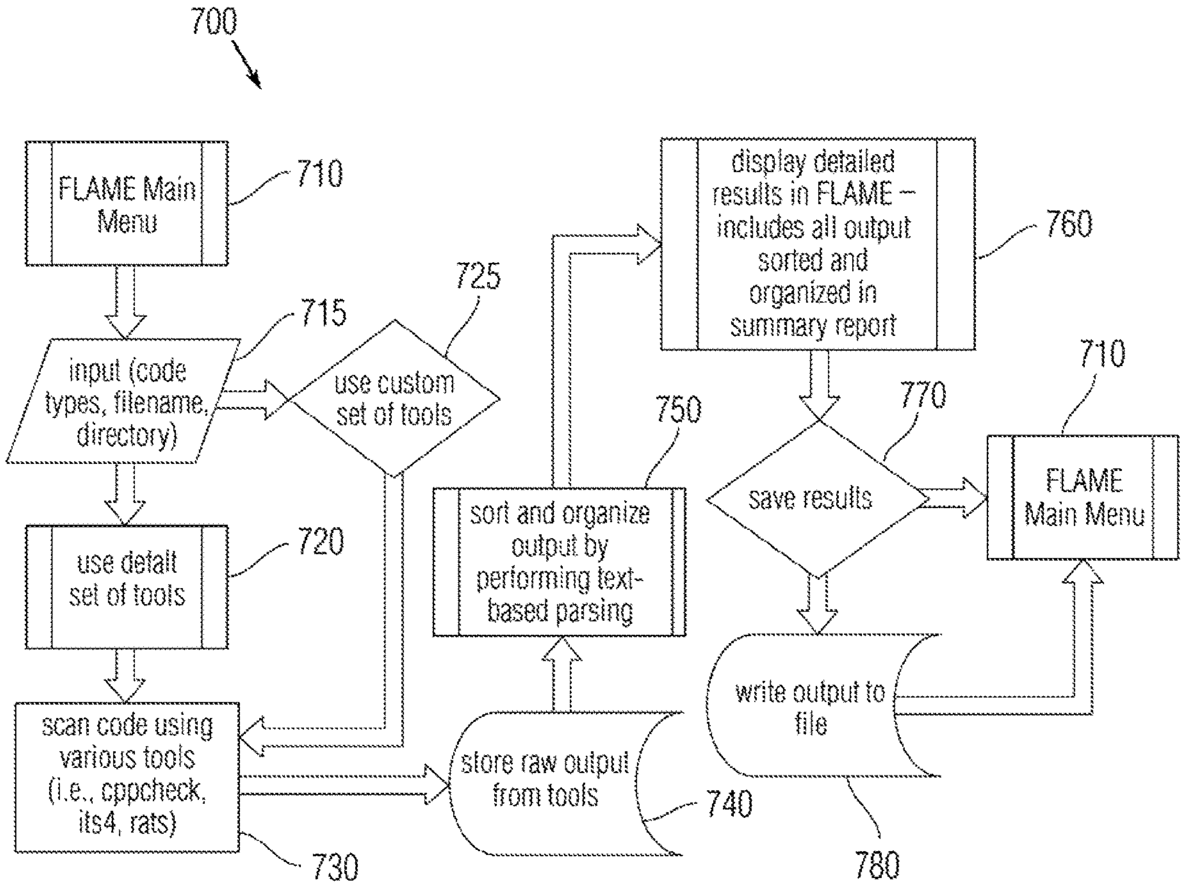
FIG. 7 is a flowchart diagram view of code scannings.

FIG. 7 shows a flowchart view 700 for the FLAME software code analysis tool (SCAT). The process begins with a FLAME main menu 710 and proceeds to receive input 715 regarding code types, filename, directory, etc. The process uses either a default set of tools 720, or else a custom set of tools 725 if selected. The process operates a scan code 730 using various tools (from either the default 720 or custom 725 tools) and stores the raw output 740. The process sorts and organizes the output 750 by parsing the text followed by displaying the results in FLAME 760 in a report 520. The process queries whether to save these results 770. If not, the process returns to the main menu 710, and results are to be saved, the process writes the output to a file 780 and then returns to the main menu 710.

Figure 8:
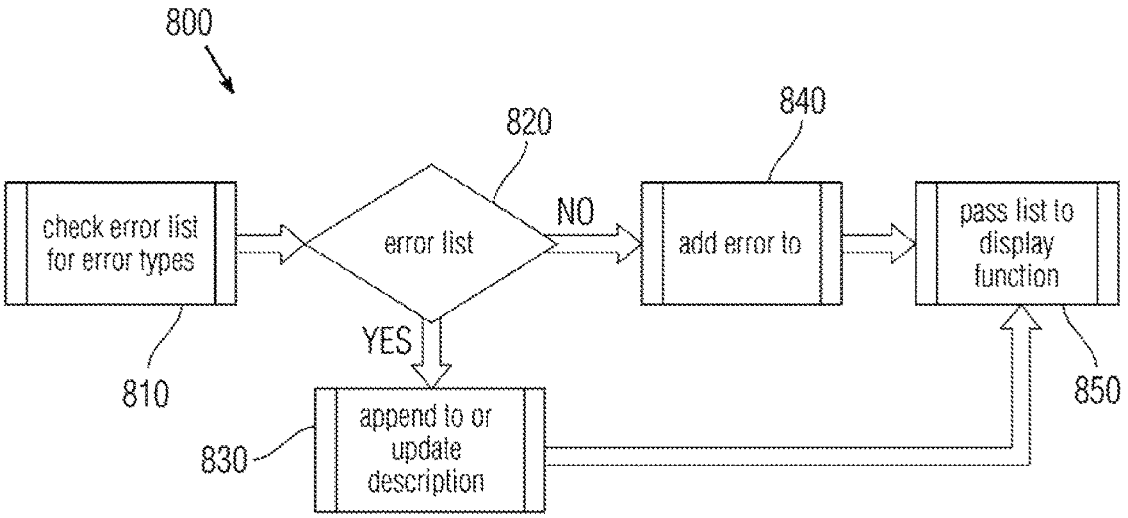
FIG. 8 is a flowchart diagram view of error listings.

FIG. 8 shows a flowchart view 800 for error checking. The process begins with checking an error list 810 for different types among the software lines of code (SLOC). This error list is generated as raw output to produce a list for subsequent display. The process inquires as to whether an error (i.e., new error type) exists 820. If so, that type is appended to or updated 830 in the description. Otherwise, the error is added to 840. From either append or add operations, the process passes the list to the display 850.

Figure 9:
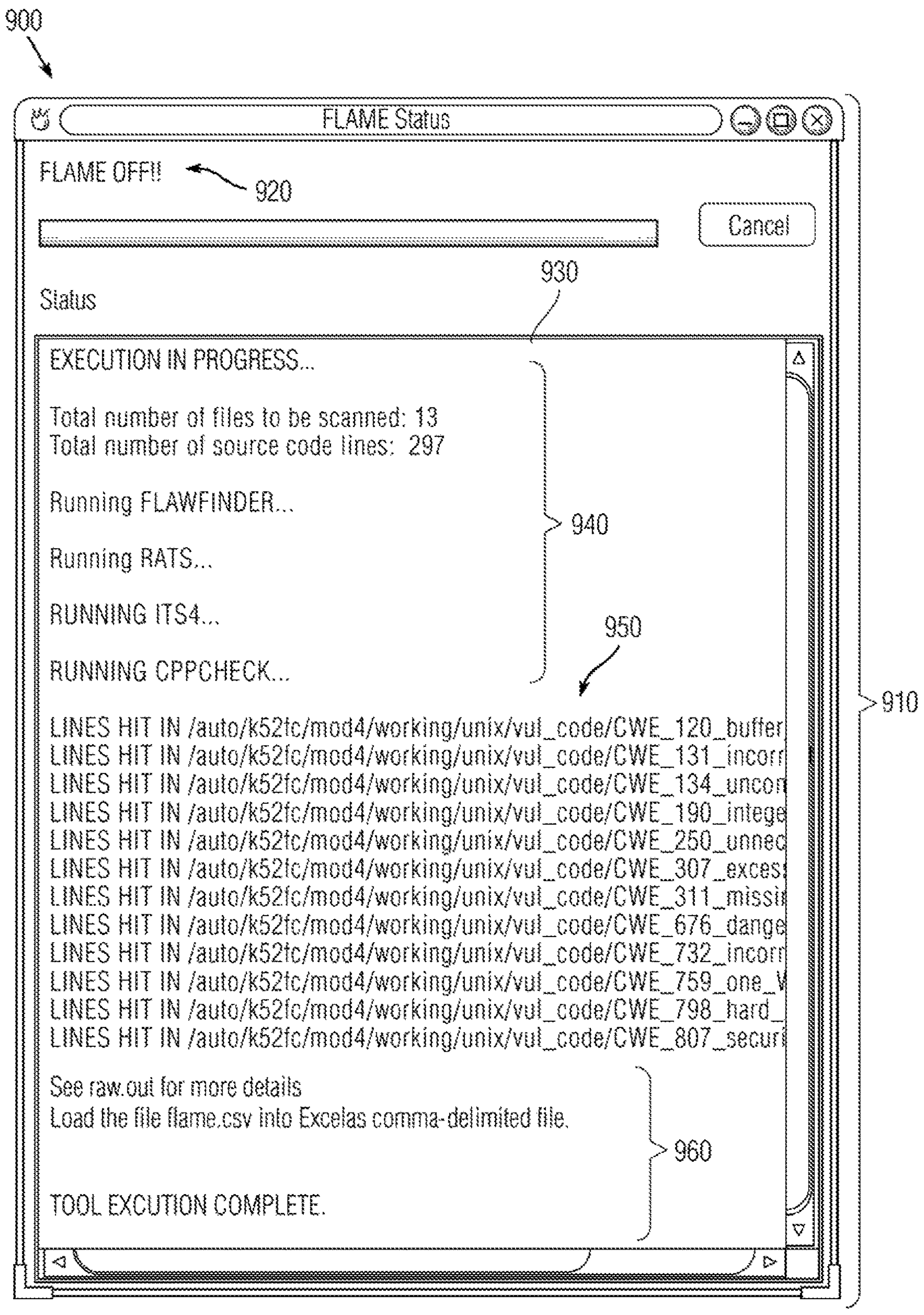
FIG. 9 is a screen view of a FLAME execution listing.
Figure 10:
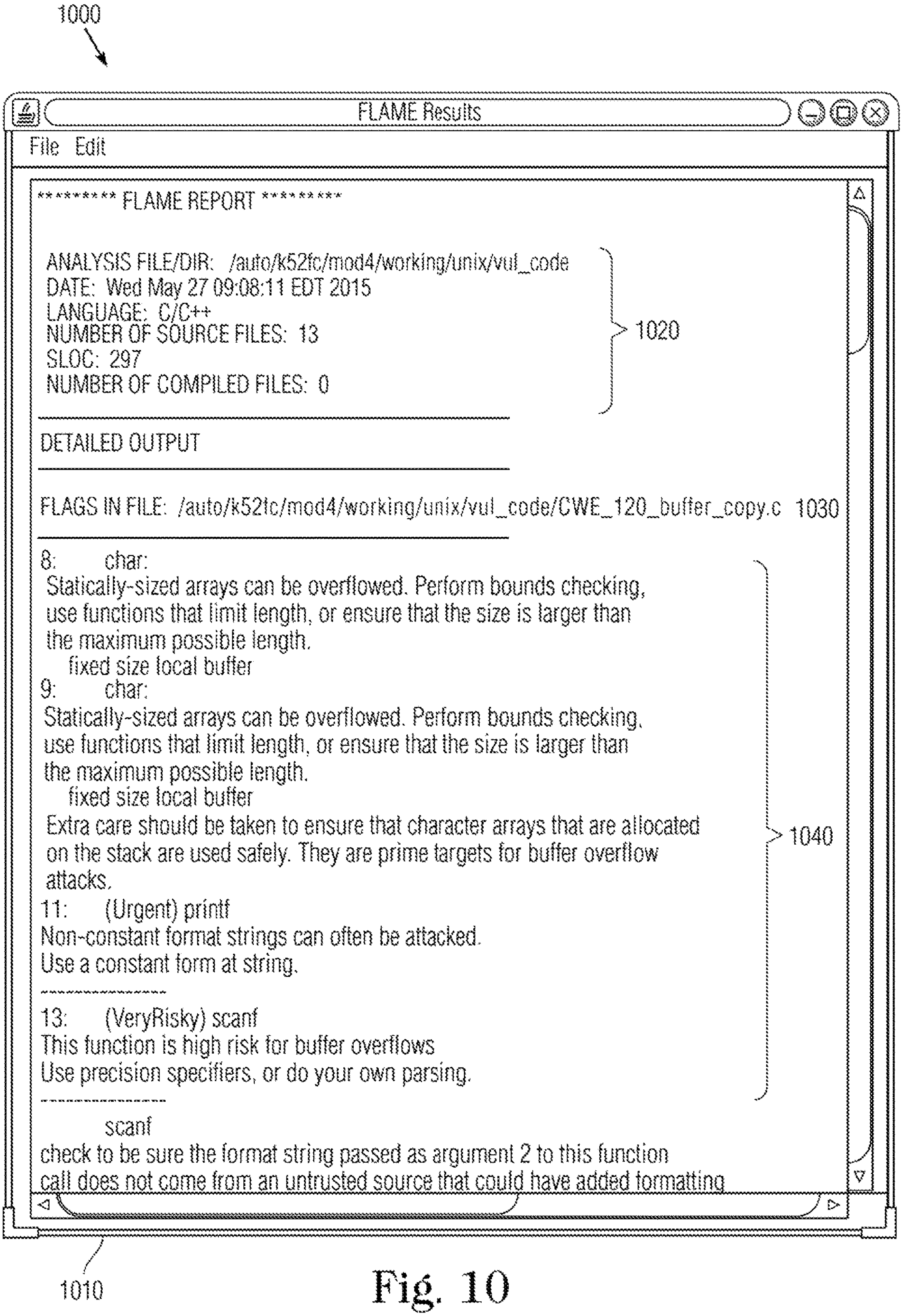
FIG. 10 is a screen view of a FLAME report

FIG. 9 shows a status completion display view 900 for FLAME. A FLAME status screen 910 features an indicator 920 and a message pane 930 that includes execution status 940, particular lines identified 950 and completion status 960. FIG. 10 shows a security scan results view 1000 for FLAME. A FLAME results screen 1010 provides a FLAME report 1020 (similar to report 520) and a detailed output with identified file 1030 as well as individual flags 1040 listed.

Figure 11:
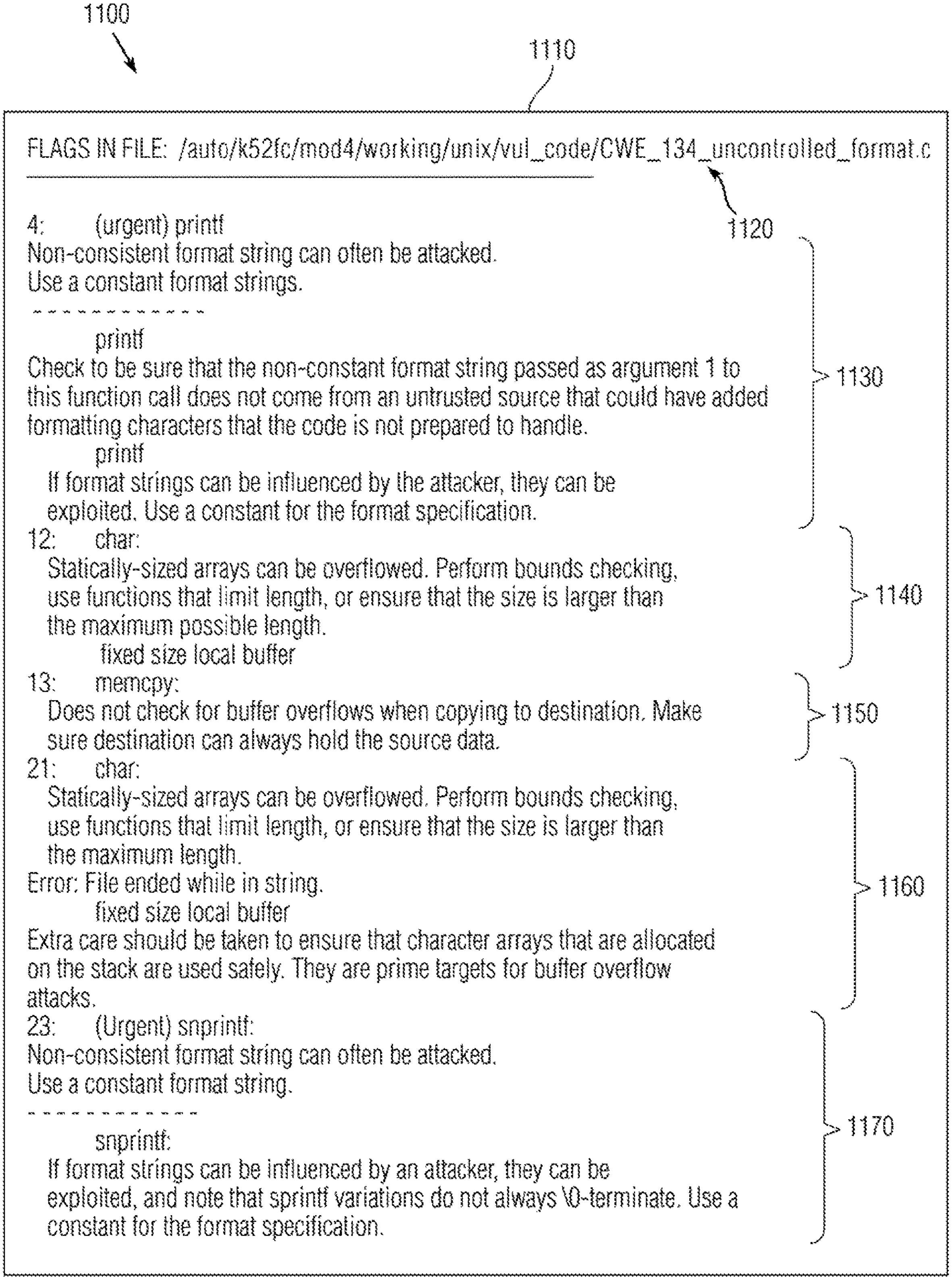
FIG. 11 is a flag list view.

FIG. 11 shows a results file view 1100 of detected flags for FLAME in a pane 1110. The associated storage file 1120 is identified. The diagnostics include a print command 1130, and several diagnostic statements corresponding to code lines: line 4 in segment 1130 with a format string statement, line 12 in segment 1140 with a warning on static-sized arrays, line 13 in segment 1150 regarding lack of a bounds overflow check, line 21 in segment 1160 with an error on file string end, and line 23 in segment 1170 with a constant format string and a warning comment.

FIG. 12 shows a results file view 1200 of flagged errors with the associated tool identified for diagnostics. The associated storage file 1210 is identified. The diagnostics are identified by line in the source code. Line 8 identifies a chroot diagnostic at section 1220 and labeled as risky. This has been found by FlawFinder and ITS4. Line 9 identifies a chdir command at section 1230. This has been found by ITS4. Line 11 identifies an open check at section 1240. This has been found by FlawFinder and ITS4. Line 16 identifies an open file at section 1250. This has been found by CppCheck.

Figure 13:
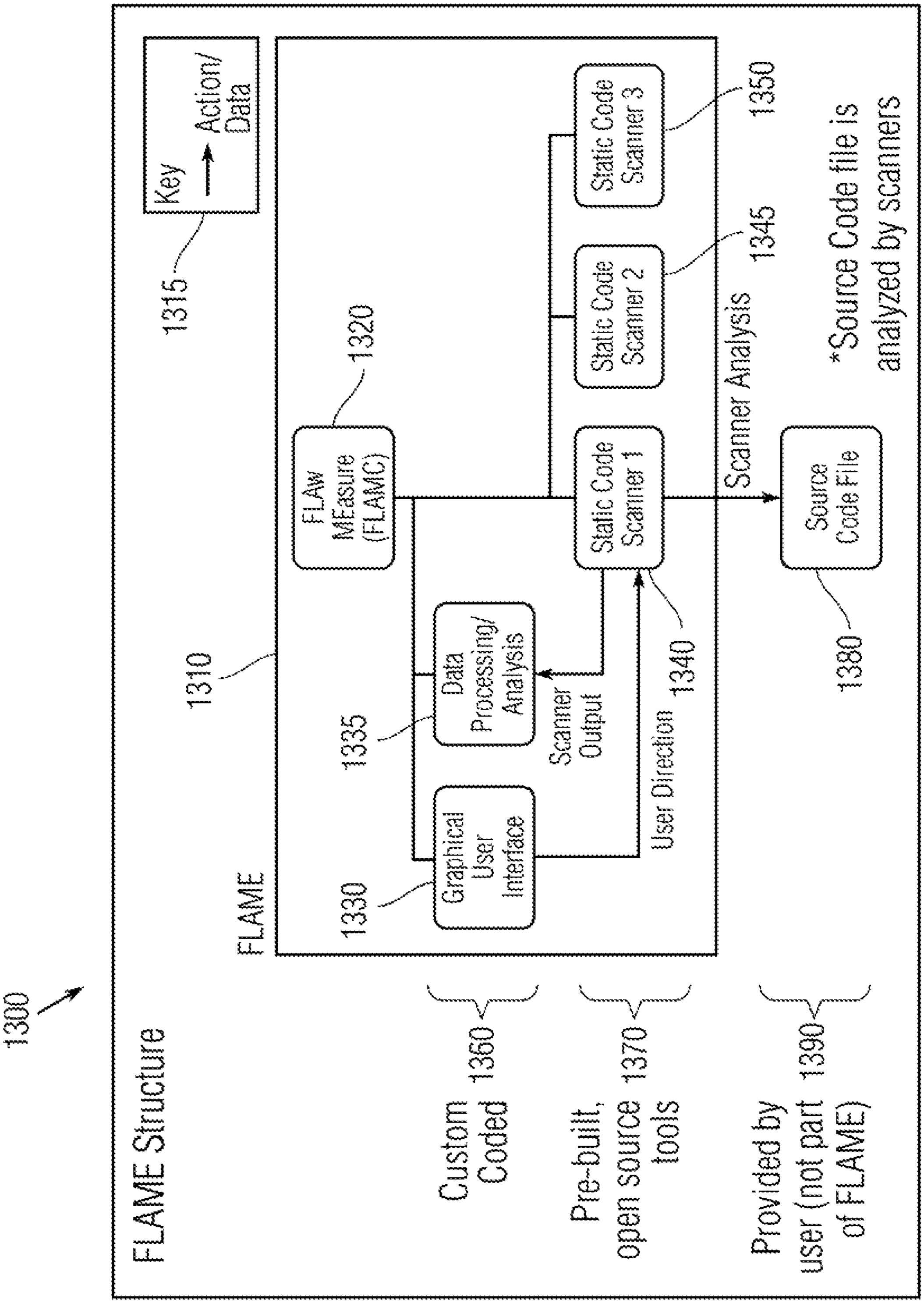
FIG. 13 is a flow diagram view of FLAME architecture.

FIG. 13 shows a flowchart view 1300 for the FLAME structure. This includes a FLAME block 1310 and legend 1315. A FLAME main routine 1320 calls custom coded instructions for the GUI 1320 and data processing analysis 1335. The first scanner 1340, second scanner 1345 and third scanner 1350 form pre-build open source tools 1370. The GUI 1320 and analysis 1325 constitute custom coded portions 1360. The scanners 1340, 1345 and 1350 constitute pre-built open source tools 1360. The first scanner 1330 provides scanner analysis for the source code file 1380, which is independently furnished by the operator as external instructions 1390.

FIG. 14 shows a preliminary results file view 1400 of a sample raw output list from scanning tools. The diagnostic list includes a buffer overflow 1410, a string set 1420, a buffer overflow 1430, a privilege setter 1440 and an array overflow 1450. A note 1460 identifies that two separate tools identified the buffer overflow 1410 and 1430 errors.

Figure 15:
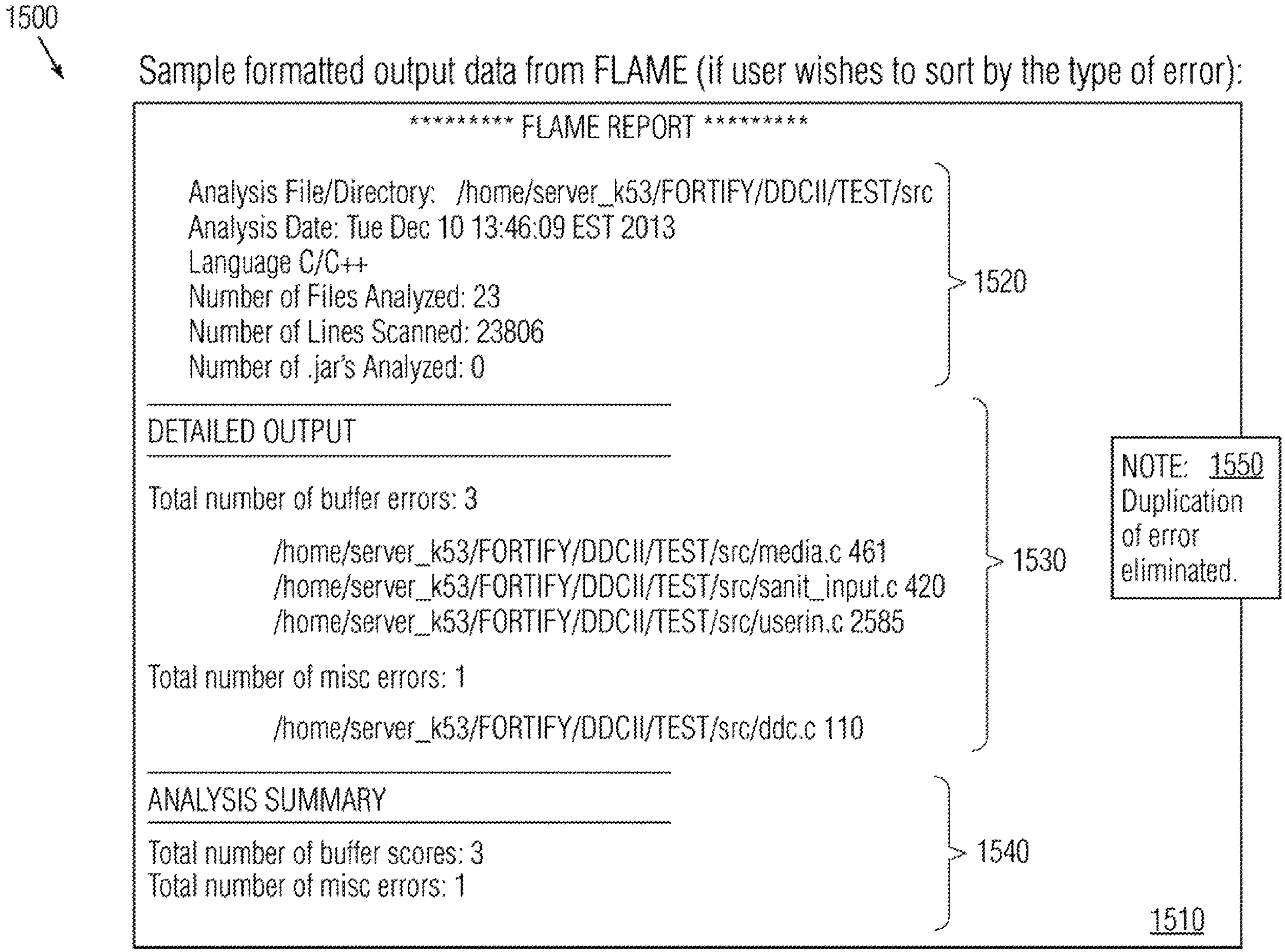
FIG. 15 is a formatted output.

FIG. 15 shows an exemplary results file view 1500 of a sample formatted output sorted by error type. The pane 1510 includes a cumulative listing 1520, a detailed output 1530 and an analysis summary 1540. A note 1550 comments on the elimination of the error duplication.

The objective of exemplary embodiments is to develop a tool to perform static source code analysis that provides comparable results at a fraction of the costs of commercially available tools. The resulting tool should be a simple, clean, and intuitive design that can be easily customized and used on a variety of programming projects. The exemplary source code analysis tool (SCAT), hereby referred to as FLAw MEasure or FLAME, to merge the outputs of multiple, pre-existing static source code scanners. The outputs will be combined in a format such that the operator can easily interpret results.

The United States Navy is trying to strengthen its computer code against cyber-attacks. One technique of accomplishing this intention involves implementing a policy of scanning the source code for vulnerabilities and then fixing these weak lines of code. Recognizing this trend, these exemplary embodiments provide opportunities for execution when the requirement is placed on government software, as well as provide defense agencies a cheaper alternative than currently available commercial tools.

FLAME provides static source code analysis on C/C++ and Java code. FLAME executes and merges the outputs of publicly available, unmodified source code scanners. These source code scanners adhere to the Industry Secure Coding Standards to ensure that the latest secure coding practices have been implemented. Unsecure coding practices create vulnerabilities in the source code, and the source code scanners will report these vulnerabilities.

FLAME serves as a conduit through which the multiple scanners can interact. The source code scanners used by FLAME have been independently developed outside of NSWC Dahlgren Division (NSWCDD) and therefore do not collaborate with each other. The source code scanners used are unmodified by NSWCDD employees. When an operator executes the scanners without FLAME, the scanners may report the same vulnerability multiple times. Meanwhile, FLAME performs the functions of executing the source code scanners from a single GUI and receiving the scanner output. FLAME then processes the output by removing duplicate vulnerabilities reported by scanners. Following the processing FLAME consolidates the unique vulnerabilities into a single file to which the operator can refer.

FLAME is a Java-based GUI that can run on any Java Virtual Machine (JVM). The operator invokes FLAME via Java command-line to start the GUI. The operator then selects the source code files to be analyzed, chooses the appropriate scanners on the display and starts the analysis. Once the scanners complete analysis and FLAME processes their outputs, a window displays the unique vulnerability information: filename, location, and the type of vulnerability. The window also includes the number of files and source lines of code (SLOC) scanned.

FLAME enables the operator to save the window of unique vulnerability information to a text file. FLAME automatically provides a comma-separated value (CSV) file so that the vulnerability information can also be viewed in Microsoft Excel. FLAME competes directly with commercially available tools like Fortify. FLAME identifies the exact same vulnerabilities as conventional code as well as a few more.

The initial FLAME GUI screen constituted a standard Java Swing application that uses a JFrame along with a combination of input fields and check boxes to determine the location and type source code to be scanned, such as shown in window 110. The operator can either enter the location of the files to be scanned, or employ the "Browse" button 155, which calls the Swing JFileChooser method and enables graphical browsing to select an individual file or a directory location. Also on the main window of FLAME, the operator can select the sort order of errors under option 170, either by filename or error type for the final document. The sort order and code file type are Swing JButtons and by using the Select( ) method, one can determine what the operator has selected for run options.

On the "Advanced Options" tab 130, the operator can leave the default options or select "custom" settings 220, which enables individual selection of scanning tools. These are Jbuttons from the Java Swing class in an "or" relationship. If the default selection is selected, all individual tool check boxes are selected and greyed out for the C/C++ 240 and Java 250 tools. All of the available tools are selected based on the code type chosen from the "Basic Options" screen. At this juncture, nothing has changed, and all of the tool values are saved in a one-dimensional array for subsequent passing to the command line run process.

FIG. 16 shows a textual view 1600 of an exemplary section of source code for selecting default options based on code type (e.g., C or Java). FIGS. 17A and 17B show textual views 1700 of exemplary sections of source code, respectively for C file and Java file selection. If the operator selects the custom button 220, FLAME enables, by the setEnabled method of the Swing checkbox, and selects all the check boxes associated with the code type 160 selected from the "Basic Options" 120. This operation employs a function called either "set_C_boxes" or "set_Java_boxes" as selected. The operator then has the option of deselecting any tools not needed for this particular execution. Upon configuration of all operator options, FLAME returns to the "Basic Operations" screen 110 and the operator selects "Run" button 180.

Several checks are made throughout the tool configuration process (e.g., file type) to ensure that every option needing input or a value meets those criteria. This includes specific items (e.g. code type) not selected or configured will prevent the user from executing FLAME. The operator can then select the "Run" button 180 on the "Basic Options" 110 to execute the desired tools on the selected source code.

For ease of understanding and working with large amounts of code in Java, separate classes were created for the different processes associated with executing each source code scanning tool. The process flow is described for only one exemplary tool (FlawFinder) in this disclosure. However, this description is exemplary only and not limiting. Each and every tool functions in an identical fashion. The only difference would be the command line options that are defined in each of the class of the source code scanning tools.

Selecting the "Run" button 180 after configuring the necessary parameters executes FLAME to create and display a Java ScrollFrame window 410, which enables the operator to observe the progress 440 of each tool during execution. Each source code scanning tool 230 selected to run executes and displays the progress after completion.

FIG. 18 shows a textual view 1800 of an object setup, run tool and store output. The process listed in the code starts by calling a routine to find the tools that have been selected in earlier stages by checking the values in the array created during tool selection. Upon checking the array and determining whether a tool has been selected, an object is instantiated for that specific tool which defines a raw output file, directory where the source files to be scanned are located, and the current directory.

The new FlawFinder object then creates another object (named run_tool) from the tool control class which uses the process methods from the Java RunTime class. The process object has methods that enable operating system commands to be executed that execute the actual source scanning tools and also monitor and collect output. A typical command line string to execute a tool appears similar to the following:

./flawfinder -dataonly -quiet /home/rclift/source-code/*.c that calls the tool with some options along with a directory with source code files.

FIG. 19 shows a textual view 1900 of Java process to run the code scanning tool "runLine", which is passed as an argument for the command line. As the tool executes, the output information is collected, converted to a string format via the process output stream (using FileOutputStream method) and the PrintWriter method from the Java input/output (IO) class to print the tool output lines to the raw output file that was passed in as an argument. This process continues until all of the tools selected have completed and scanned all source code files. FIG. 20 shows a textual view 2000 of a Java IO scanner to print tool output stream into a raw output file.

The raw output file, now containing all output from each source code scanning tool, is then in a format that can be viewed by the operator but is automatically scanned through by FLAME to create a final report that can be sorted either by file type or error type. Another method (process_tool-_Data) reads the raw output file and matches patterns based on known output types then stores each error type, line number, filename and error description to multiple Java arrays. FIG. 21 shows a textual view 2100 of the output from the FlawFinder 1.27 source code scanning tool.

FLAME uses regular expressions and Java pattern compilation to dissect and insert components of each line by a storeData method. Regular Expressions are at the core of FLAME by selectively gathering the pertinent information from the output files to reduce extraneous data and only storing what is important. For example, using the output data above from FlawFinder, the regular expression "(/.+): (.+): \\[.\\] \\((.+)\\" would only produce the following output, which would then be stored in the appropriate Java array for the final report.

FIG. 22 shows a textual view 2200 an exemplary output after applying the regular expression. Then each item in the different array list, based on error type and filename, is then added to a Java Map to remove duplicates, and then hashset that list to provide a ready manner to sort the errors. This is an important part of FLAME because most of the source code scanning tools find identical errors and in the final report only lists each error type and/or filename in a single instance. FIG. 23 shows a textual view 2300 of a hashset addition for storing filename errors.

The final step is to print the hashset to the execution progress window based on the sort order selected 170. An object can be instantiated from a PrintData class so to simply print the hashset. FIG. 24 shows a textual view 2400 of an example of code indicating selection. For the sort preference by "error type", FLAME prints the number of errors 1530 based on the size of the hashset. FLAME then loops through a Java Map created based on the data in the hashsets, and prints the filename and line number for each error. Finally the operator has the option to save the final report along with a comma separated value (CSV) file created automatically that can be imported into Excel. The FLAME GUI 110 also provides some basic help pages in the view 100 menu bar describing each source code scanning tool and some tips on running FLAME, types of output generated and how FLAME is structured.

NSWCDD has been investigating commercially available tools (e.g., Fortify) to perform source code analysis on existing C/C++ and Java code. Fortify is a commercial product that NSWCDD received as a demonstration, but the initial procurement cost has prevented any further testing or development with the tool. FLAME was a developed using publicly available free tools that perform source code analysis on both C/C++ and Java. A tool such as FLAME can be used to reinforce secure coding practices and ensure that the fleet operates with low vulnerability systems.

FLAME uses publicly available source code scanners that are free and licensed under the GNU General Public License or other public use licenses.

Some of the major benefits of FLAME include:

Source code scanners can be added or removed from FLAME depending on the project scope and type of analysis needed.

No modification of the source code scanners is required.

Open source licensing enables the scanners used by FLAME to be customized based on project needs.

The scanners used by FLAME are maintained by an open-source community so changes and improvements are a collaborative effort and tested in many different environments and projects.

FLAME is written in Java, which is a platform-independent programming language which makes for easier portability.

FLAME is able to run the scanners, receive information from the scanners, and process the scanner output to be reported in a single file of unique vulnerabilities.

Reinforces secure coding practices to ensure that low vulnerability systems are deployed.

FLAME's two novel features are its ability to remove duplicates from the findings of two or more open source tools and its ability to reduce false positives from the findings of the open source tools. FLAME comprises of several free-ware, scanning tools wrapped into an individual GUI. The development of FLAME has mainly focused on the GUI design and data processing to ease the operator experience.

Currently, two variants of FLAME have been developed: Unix and Linux. The Unix variant can analyze C/C++ and Java code. The Linux variant can only analyze C/C++ code. The developers encountered difficulties compiling the Java freeware tools in the Linux environment.

One must ensure that the FLAME binary file Flame_On-.jar is available and executable. The binary Flame_On.jar needs to be located in a directory where the operator at least has write and execute permissions. The binary is located in one of the following paths:

for DGS (Unix Variant):

/auto/home_serverk52/k52/flame/projects/flame_al/dist and for RHL Machine (Linux Variant):

/root/NetBeansProjects/flame_al/dist accordingly.

From the command line, type 'java-jar Flame_On.jar'. This brings up the window 110 shown FIG. 1. The basic options tab 120 is the first panel 140 shown to the operator. The operator provides following information:

(1) The full path to the file or directory to be examined in dialog box 150. The Browse button 155 may be used to find the file or type the path in the text field. If a directory is selected, FLAME analyzes files in all subdirectories.

(2) The type of file(s) to be examined; either C/C++ or Java in type box 160. FLAME can analyze C/C++ and Java source code and compiled Java programs. FLAME cannot analyze compiled C/C++ at present.

(3) The manner the output is to be sorted in sort box 170; either by the error type or the name of the file.

Once all required inputs are satisfied, the operator may click the "Run" button 180 on the Basic Options tab 120 to begin analysis of the files named in the "Input File" field. If the operator desires to close the program the "Exit" button 190 can be clicked at any time. The FLAME GUI enables the operator to select the specific tools to be used for analysis. These options can be seen by selecting the Advanced Options tab 120 at the top of the window. FIG. 2 shows the Advanced Options window 210.

FLAME is automatically set to run the default execution options. The default option will run all the applicable tools based on the File(s) Type in box 160 selected by the operator in the Basic Options tab 110. For example, if the operator selects the File Type as Java, then the default option employs FindBugs, Checkstyle, and PMD to analyze the code.

The operator can select the Custom button within the FLAME Execution box 220 to choose a subset of the tools. Clicking the Custom button enables the checkboxes in the Custom Tool Selection box 230. When the custom button is selected only the checked tools are used for analysis.

If the operator changes the name of the file or directory to be analyzed, FLAME resets to default setting. Assuming the operator desires to learn more about the specific tools, a "Help" option 320 is provided in the menu bar for the Basic Options Panel 120. The operator can click on this Help option to see the other menu items shown in the window 310 of FIG. 3:

Under Help>Tool References 330, a quick summary of each tool is provided once the operator clicks on either option.

Under Help>FLAME User Guide 320, a copy of the user guide can be accessed through the GUI.

Once all inputs have been configured, the operator can click the "Run" button 180 on the Basic Options Panel 110. This instantiates a new window 410 with a progress bar to provide run-time updates to the operator. The status window reports "TOOL EXECUTION COMPLETE" in the panel 430 once analysis has finished.

As expected, the more files for analysis the more time FLAME needs for execution to analyze them. However, FLAME run-time significantly increases when FindBugs is used to analyze what constitutes compiled Java code. For example, FLAME requires nearly forty minutes to analyze seventy .jar files. This performance is typical for FindBugs. Therefore one should expect longer run-times when FindBugs has been selected for use. All of the raw, unprocessed outputs from the tools are recorded in a file called raw.out. Also, the file "flame.csv" provides a form of the processed data. This file can be loaded into Microsoft Excel as a comma CSV file. These should be used or moved to avoid being overwritten.

If files raw.out and/or -Flame.csv previously exist, FLAME overwrites these files when the operator clicks the Run button 180 again. The processed and sorted output appears in a new window once analysis is complete. A general idea of how this window appears is shown in FIGS. 5A and 5B. The particular example case used yielded no results.

Under File>Save As . . . , the operator has the option to save the processed and sorted results in a specific location. If this information is not saved, all the data shown on the window will be lost upon closing the window by the operator. The classification of the FLAME results will be the same classification of the source code analyzed. For example, if FLAME analyzes classified source code then raw.out, flame.csv, and the processed data are all classified documents.

For a software developer who just finished programming a revision of Fire Control, one can assume that this Fire Control has been implemented according to software coding best practices, and this implies that there should be very few security vulnerabilities. Code delivered with such vulnerabilities will be susceptible to malicious attacks; something not ideal for the software of nuclear weapons control.

Code may be examined to evaluate security vulnerabilities. A competent programmer who is mindful of the extra work caused by late changes in code may decide to check for security vulnerabilities by the exemplary code analyzer known as FLAME to all of the C/C++ source code files for the project. These source code files are located within the directory: /auto/k52fc/mod4/working/unix/vul_code accordingly.

The process involves the following operations:

(1) Begin by running FLAME as directed in "Running FLAME".

(2) Select the directory through the file browser as indicated in the "Basic Options" Section.

(3) Select C++ File on the Basic Options tab 110.

(4) To read the output organized by where the input was found. Click the File Name radio button on the Basic Options tab 110.

(5) The window 510 now appears as shown in FIG. 5A.

(6) Now suppose the operator only desires to use the default tool setting, which runs all of the possible C++ checking tools. Then nothing needs to be changed in the Advanced Options tab 120.

(7) Click the Run button 180.

(8) A status window pops up with a progress bar. Upon completion of the run, the window resembles screen 410 in FIG. 4.

(9) At this point FLAME has executed all the C/C++ Freeware Tools available. FLAME has compiled all of the output from those tools into a user-friendly, readable format. The window 1010 shown in FIG. 10 displays the results of the security scan.

(10) The operator can easily examine such results, looking for potential security vulnerabilities in each specific file. The outputs and descriptions from all of the freeware scanning tool are cumulated.

For example, an example of high risk security vulnerabilities would be buffer overflows. An artisan of ordinary skill will recognize that the file CWE_134_uncontrolled_format.c heavily uses buffers. The following excerpt of the FLAME output shows the security vulnerabilities found in that file. In FIG. 11, lines 4 and 23, corresponding to sections 1130 and 1170, contain a non-constant format string that can be attacked by a hacker.

Examining the FLAME results of another C source file yields are the excerpt in FIG. 12. On the right in section 1240 is noted which freeware scanning tools found each security vulnerability. From this, the clear advantages of FLAME can be observed. No tool alone is able to find all of the security vulnerabilities of this particular file, but FLAME combines the results to provide better and more reliable output for the end user analysis.

FLAME uses CppCheck v1.61, Rats v2.3, Its4 v1.1.1, and FlawFinder v1.27 to statically scan C/C++ source code. To scan Java source code, FLAME uses PMD v5.0.5 and CheckStyle v5.6. The only tool capable of scanning compiled code is FindBugs v2.0.2. FindBugs cannot scan Java source code. All the tools mentioned are available for free download and relatively easily to compile and execute.

The FLAME developers originally used the NetBeans IDE as the text editor and compiler. Therefore, one can easily open the FLAME project by opening it through the NetBeans IDE. The Flame project is located at the following path:

DGS (Unix Variant):

/auto/home_serverk52/k52/flame/projects/flame_al and

RHL Machine (Linux Variant):

/root/NetBeansProjects/flame_al accordingly.

The FLAME source code consists of two main packages: Flame_On and tools. The Flame_On package relates to the GUI, reading user inputs, and processing the data output from the freeware tools. The tools package includes individual classes for each specific freeware tool. This eases modification of FLAME in case a developer desires to update or delete these tools from the GUI.

A template called DefaultTool.java can be provided with the source code. This template details what portions of the template needs to be changed in order to add a new tool to FLAME. The template can be found at the following path: DGS (Unix Variant):

/auto/home_serverk52/k52/flame/projects/flame_al/templates and RHL Machine (Linux Variant):

/root/NetBeansProjects/flame_al/templates accordingly.

The resources folder contains all the files needed in order to run the tools. This resources folder is rolled up in the .jar file, such that no file but the Flame_On.jar file is needed in order to run FLAME. The code uses the resources folder by copying the needed files into the current directory, executing the tool, and then deleting the tool files when execution of the tool is complete.

This explains why the operator needs to have write and execute permissions in the directory where the Flame_On.jar file is located.

Improve Linux variant to enable for scanning of Java.

Develop Windows variant.

Enable the operator to directly edit source code through the GUI.

Provide the capability to generate pdf/html reports for management.

Produce graphs for results.

Use multi-threading techniques so that tools can run simultaneously, cutting down run-time.

Use more sophisticated data processing such that descriptions won't be repeated.

Investigate other static source code scanners to incorporate with the GUI.

Provide the ability to dynamically scan code.

Investigate sorting techniques to group the error types. This became difficult because different tools report different error categories.

Regularly update the current tools used, as new versions of the freeware will most likely be available on internet sites like www.SourceForge.net in future developments.

FLAME is written in Java and then packaged into a .jar file along with all the resources and metadata needed to distribute a complete application that is platform independent. FLAME uses many different available Java features, and sometimes terms are used interchangeably throughout this disclosure and drawings. As a lexicon, a list of the following terms is provided:

Array—container to hold values

Array list—object that can hold multiple arrays

GUI—graphical user interface

HashSet—object to store data based on a key/value pair

JFileChooser—graphical object used for browsing the system folders

JFrame—a window that has closing and minimizing buttons, and can also be used to display graphics along with other textual based data Method—enables operations on an object PrintWriter—enables printing in human readable format Regular Expression—characters that define search patterns ScrollFrame—an output window that enables scrolling Swing—GUI widget toolkit for Java.

The basis behind FLAME involves using multiple open source code scanning tools to assist in the detection of coding errors or potential vulnerabilities that would have adverse effects once the software is compiled and distributed in production. The actual benefit of using FLAME relies upon several algorithms to sort through the output of each tool selected to scan source code and then produce consistent results. FLAME enables the operator to readily execute any combination of the available code scanning tools from a single graphical user interface and produce a report that can be viewed and/or saved in a text format for documentation.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented consolidation method identifying software vulnerability anomalies in a source code, said method comprising: providing a plurality of diagnostic tools, each tool of said plurality able to detect at least one anomaly of the anomalies in the source code;

receiving the source code;

selecting a subset plurality of tools from said plurality of diagnostic tools;

scanning the source code by said subset plurality for the anomalies to produce a diagnostic output;

wherein said subset plurality of tools includes first and second tools, and the anomalies include first and second errors determined respectively by said first and second tools, so as further comprising: assigning said duplicate as said second error for removal under condition that said second error is identical to said first error;

sorting said output by removing a duplicate of said anomaly of the anomalies into a report; and saving said report into memory.

2. The method according to claim 1, further comprising:

providing a default list and a custom list from said plurality of error diagnostic tools;

prompting an input from among one of said default and custom lists; and assigning said input for said subset plurality of tools.

3. The method according to claim 1, further comprising: displaying said report on a screen monitor.

4. The method according to claim 1, wherein saving said report into memory further includes writing said report to a file.

5. The method according to claim 1, wherein said subset plurality of tools includes distinguishing between source code languages.

6. The method according to claim 2, wherein said custom list has at least one tool of said plurality of error diagnostic tools that corresponds to a code language.

7. The method according to claim 2, wherein said custom list has at least one tool of said plurality of error diagnostic tools that corresponds to C/C++.

8. The method according to claim 2, wherein said custom list has at least one tool of said plurality of error diagnostic tools that corresponds to Java.

9. The method according to claim 1, wherein said sorting said output further includes parsing text from said output.

* * * * *